Nov. 17, 1931.    S. G. BAITS    1,832,274
BRAKE DRUM SHIELD
Filed Feb. 14, 1930
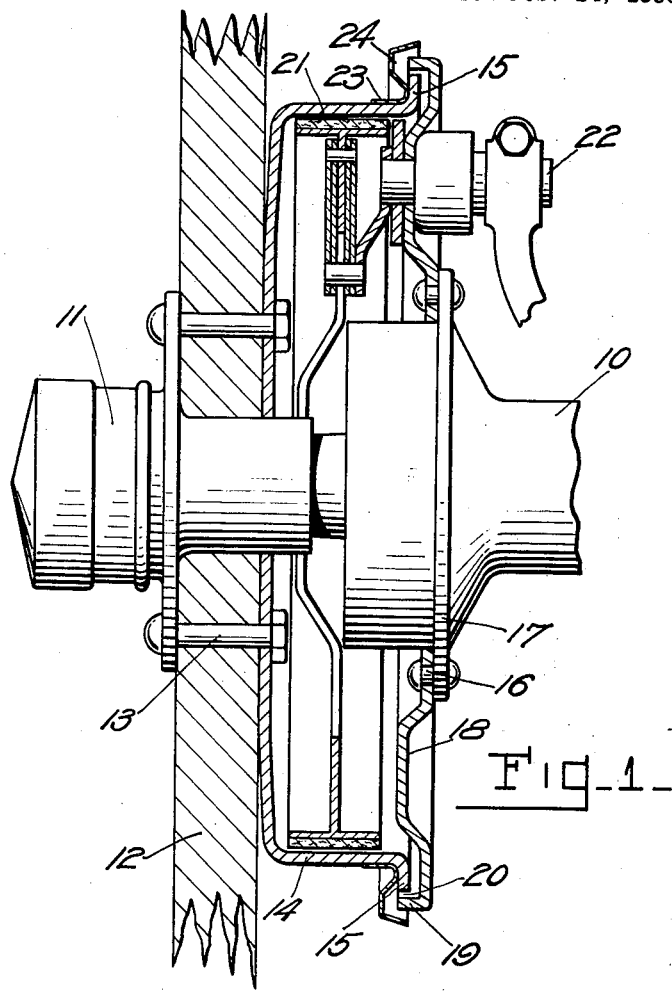
Fig-1-
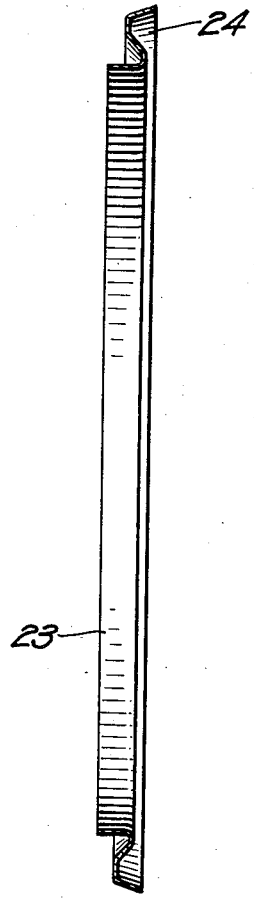
Fig-2-
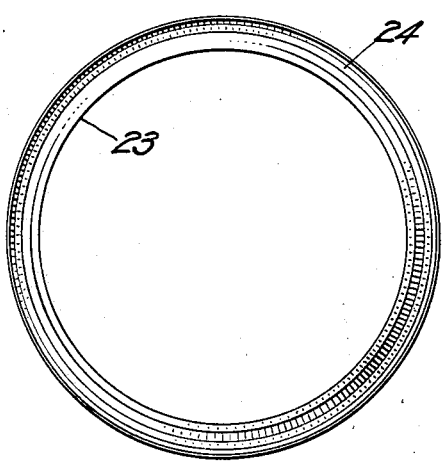
Fig-3-
INVENTOR:
Stuart G. Baits.
by MacLeod, Calver, Copeland & Dike.
Attys.

Patented Nov. 17, 1931

1,832,274

UNITED STATES PATENT OFFICE

STUART G. BAITS, OF GROSSE POINTE PARK, MICHIGAN, ASSIGNOR TO HUDSON MOTOR CAR COMPANY, OF DETROIT, MICHIGAN, A CORPORATION OF MICHIGAN

BRAKE DRUM SHIELD

Application filed February 14, 1930. Serial No. 428,404.

This invention relates to internal brakes for motor and other vehicles and has for its object to provide means for excluding dirt and water from the brake mechanism.

A vehicle brake of the internal type usually includes a hollow brake drum secured to the wheel and having an open inner side, brake mechanism within the drum, and a plate or disk secured to the axle, supporting the brake mechanism, and substantially closing the open side of the drum. Since the brake drum is carried by and rotates with the wheel, whereas the plate or disk is fixed to the axle, it is necessary, for obvious reasons, to provide a certain amount of clearance between these parts, resulting in an open joint through which wheel splash may find its way into the interior of the drum and to the brake mechanism therein. The present invention has for a more particular object to provide simple and inexpensive means for effectively shielding the open joint referred to but without itself requiring any interengagement of relatively moving parts.

The invention will best be understood from the following description of a preferred embodiment thereof illustrated in the accompanying drawings, but it will also be understood that the particular construction described and shown has been chosen for purposes of exemplification merely, and that said invention, as defined by the claims hereunto appended, may be otherwise embodied without departure from the spirit and scope thereof.

In said drawings:

Fig. 1 is a vertical section of the brake mechanism associated with one of the road wheels of a motor vehicle.

Fig. 2 is a detail sectional view of the shield.

Fig. 3 is an elevation on a reduced scale of the shield as viewed from the right in Fig. 2.

Referring to Fig. 1, 10 denotes a motor vehicle axle on which is rotatably mounted a wheel having a hub 11 and spokes 12. Secured, as by bolts 13, to the inner side of the wheel is a dished or hollow brake drum 14 having an open inner side surrounded by a radially outwardly disposed annular flange 15. Secured, as by bolts 16, to a flange 17 on the axle 10 is a disk or plate 18 which substantially closes the open side of the drum 14 and which is formed with a cylindrical flange 19 enclosing the flange 15 on the drum, sufficient clearance being provided between said flanges to prevent their engagement in service and to result in an open joint 20. The brake mechanism 21, herein shown as of the internal expanding type, is located within the drum 14, is supported by the plate 18, and is provided with suitable operating means, generally indicated at 22, likewise carried by said plate. For the purpose of shielding the open joint 20 from road splash from the wheel, there is, in accordance with the present invention, provided an annular sheet metal member having a cylindrical portion 23 pressed on the drum 14 from its outer side to a point determined by engagement of said member with the flange 15, and an annular channel-shaped portion 24 seated against said flange 15 and arranged to embrace and shield, without engaging, the joint 20. It will be observed that the shield is located between the wheel and the joint 20, and that the channel-shaped portion thereof opens away from the wheel and toward said joint. This effectually protects the joint from wheel splash without requiring any interengagement of relatively moving parts.

The attachment described can be produced and applied at trifling cost but has nevertheless been found in practice to perform its intended function in a wholly satisfactory manner.

Having thus described my invention, I claim:

1. In a vehicle, the combination with a hollow brake drum having an open side, brake mechanism therein, and a plate supporting said mechanism and closing the open side of said drum, of an annular member having a cylindrical portion pressed on said drum and a channel-shaped portion shielding without engaging the joint between said plate and drum.

2. In a vehicle, in combination, a hollow brake drum having an open side surrounded by a radially outwardly disposed annular flange, brake mechanism in said drum, a plate supporting said mechanism and having a cylindrical flange enclosing the flange on said drum, and an annular channel-shaped member shielding without engaging the joint between said flanges.

3. In a vehicle, in combination, a hollow brake drum having an open side surrounded by a radially outwardly disposed annular flange, brake mechanism in said drum, a plate supporting said mechanism and having a cylindrical flange enclosing the flange on said drum, and a shield for the joint between said flanges, said shield comprising an annular sheet metal member having a cylindrical portion pressed on said drum and a channel-shaped portion seated against said annular flange and opening toward said joint.

4. In a vehicle, in combination, an axle, a wheel rotatable with respect thereto, a hollow brake drum carried by said wheel and having an open side, brake mechanism in said drum, a plate carried by said axle, supporting said mechanism, and closing the open side of said drum, and an annular shield having a channel-shaped portion opening away from said wheel and toward the joint between said plate and drum.

In testimony whereof I affix my signature.

STUART G. BAITS.